United States Patent
Wilcken et al.

(10) Patent No.: US 7,346,281 B2
(45) Date of Patent: Mar. 18, 2008

(54) HYBRID RF/OPTICAL COMMUNICATION SYSTEM WITH DEPLOYABLE OPTICS AND ATMOSPHERE COMPENSATION SYSTEM AND METHOD

(75) Inventors: Stephen K Wilcken, Seattle, WA (US); Jonathan M Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 601 days.

(21) Appl. No.: 10/885,553

(22) Filed: Jul. 6, 2004

(65) Prior Publication Data

US 2006/0008274 A1    Jan. 12, 2006

(51) Int. Cl.
*H04B 10/00* (2006.01)
(52) U.S. Cl. .................. 398/122; 398/121
(58) Field of Classification Search ......... 398/115–131
See application file for complete search history.

(56) References Cited

U.S. PATENT DOCUMENTS

| | | | |
|---|---|---|---|
| 378,973 | A | 8/1888 | Schindler et al. |
| 745,993 | A | 8/1903 | Brusgard et al. |
| 4,282,527 | A | 8/1981 | Winderman et al. |
| 4,477,814 | A | 10/1984 | Brumbaugh et al. |
| 4,636,797 | A * | 1/1987 | Saffold et al. ............. 343/725 |
| 5,034,997 | A | 7/1991 | Iwasaki |
| 5,214,438 | A | 5/1993 | Brusgard et al. |
| 5,291,333 | A * | 3/1994 | Mills et al. ................ 359/601 |
| 5,327,149 | A | 7/1994 | Kuffer |
| 5,479,595 | A | 12/1995 | Israelsson |
| 6,049,593 | A | 4/2000 | Acampora |
| 6,285,481 | B1 | 9/2001 | Palmer |
| 6,307,521 | B1 | 10/2001 | Schindler et al. |
| 7,113,707 | B2 * | 9/2006 | Pepper ...................... 398/129 |
| 7,171,126 | B2 * | 1/2007 | Cicchiello et al. ......... 398/129 |

OTHER PUBLICATIONS

WO 02/32020 A1—PCT.
Patent application entitled: "Lenslet/Detector Array Assembly for High Data Rate Optical Communications"; U.S. Appl. No. 10/961,173, filed Oct. 8, 2004.
"New Paint Compounds Provide Early Detection of Corrosion to Aircraft"; AFOSR: Research Highlights Jul./Aug. 1999.
Tao, et al. "Wideband fully differential CMOS transimpedance preamplifier," Electronics Letters 39(21): Oct. 16, 2003; 2 pages.
Oh, et al. "A 2.5Gb/s CMOS Transimpedance Amplifier Using Novel Active Inductor Load," 27th European Solid-State Circuits Conference, Villach, Austria, Sep. 18-20, 2001.

(Continued)

*Primary Examiner*—Agustin Bello
(74) *Attorney, Agent, or Firm*—Harness, Dickey & Pierce, P.L.C.

(57) ABSTRACT

An antenna system for receiving both RF wave and optical wave radiation via a single antenna aperture that may be moved between stowed and deployed configurations as needed. The system includes a wavefront correction system for correcting optical wavefront distortion errors caused by anomalies in the shape of the antenna aperture itself, as well as optical wavefront distortion errors caused by atmospheric perturbations. The optical components used for optical signal conditioning are supported from the antenna aperture and form a compact, unobtrusive means for separating electromagnetic and optical wave signals received by the antenna aperture.

30 Claims, 2 Drawing Sheets

OTHER PUBLICATIONS

Ambundo, et al. "Fully Integrated Current-Mode Subaperture Centroid Circuits and Phase Reconstructor," 10$^{th}$ NASA Symp. VLSI Design, Albuquerque, NM Mar. 2002.

Rienstra, J.L. and Ballard, M., "MTI focal plane assembly design and performance," 13 pages, dated Jun. 30, 1999.

Patent Application entitled "Combined Optical and Electromagnetic Communication System and Method," filed Aug. 10, 2004.

WO 02/32020 A1—PCT Apr. 18, 2002.

Patent application entitled: "Lenslet/Detector Array Assembly for High Data Rate Optical Communications"; U.S. Appl. No. 10/961,173, filed Oct. 8, 2004.

* cited by examiner

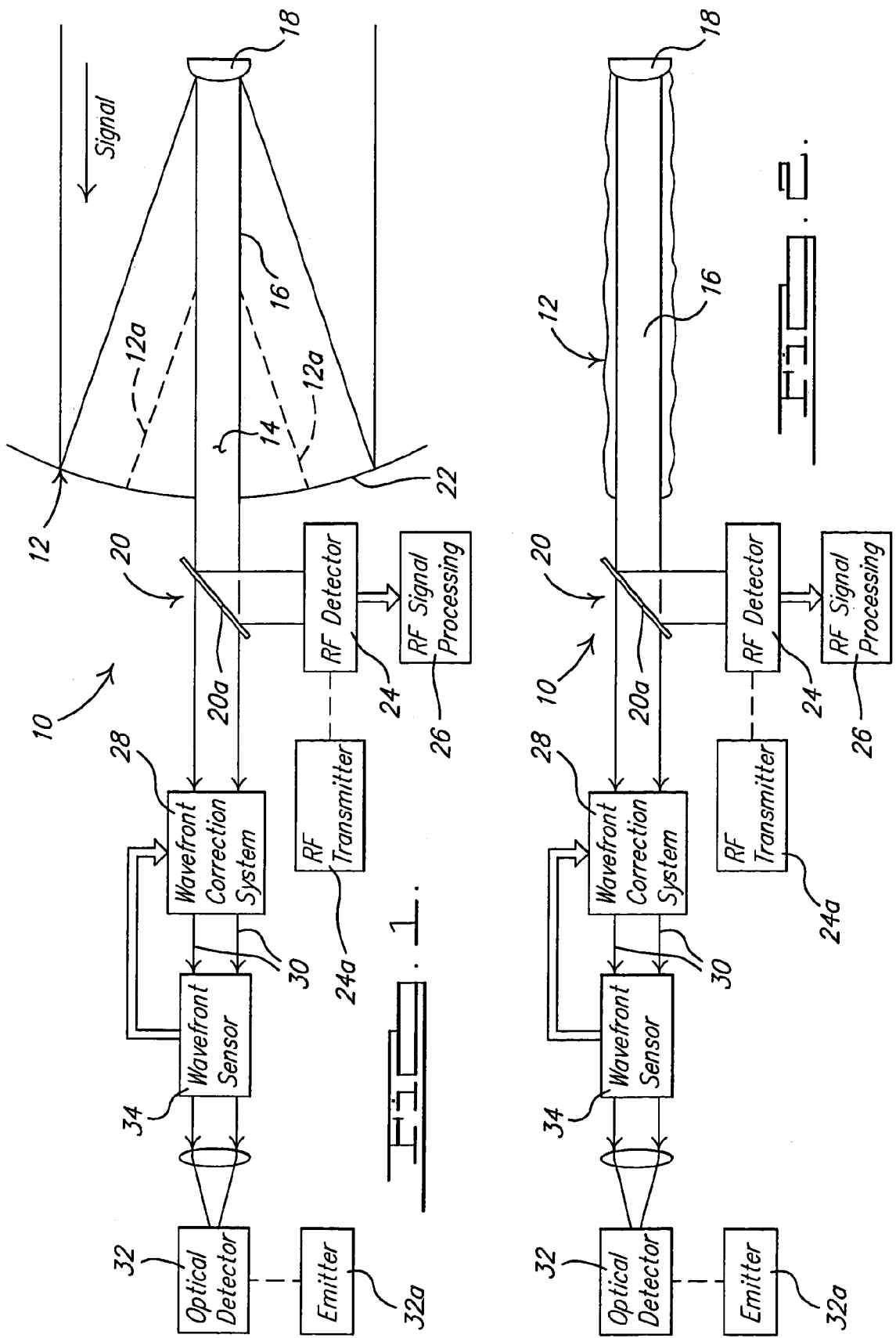

HYBRID RF/OPTICAL COMMUNICATION SYSTEM WITH DEPLOYABLE OPTICS AND ATMOSPHERE COMPENSATION SYSTEM AND METHOD

TECHNICAL FIELD OF THE INVENTION

This invention relates to antenna systems, and more particularly to a deployable antenna system able to receive and transmit radio frequency (RF) and optical frequency radiation, and to correct for wavefront distortion in the received optical radiation caused both by geometric anomalies in the antenna aperture itself, as well as wavefront distortion caused by atmospheric factors.

BACKGROUND OF THE INVENTION

Optical communications are rapidly becoming the preferred approach for secure, high-bandwidth communications. The size and weight of large optical structures (lenses or mirrors, including mounts) suited for optical communications has largely precluded their mobile, individual use. The optical equipment has not supported RF communications, forcing users to also carry RF equipment, too.

A compact, lightweight, field deployable antenna system of the present invention enables both optical and RF bidirectional communications (transmit and receive) from a single antenna aperture. Such an antenna may also be stowed for transport.

SUMMARY OF THE INVENTION

Therefore, the present invention is directed to an antenna system capable of simultaneously receiving and/or transmitting both radio frequency (RF) and optical radiation signals via a single antenna aperture. The antenna aperture can be transformed from a non-operative configuration where it presents a compact, easily transported structure, to an operative configuration in which it can receive both RF and optical signals. The antenna system, in one preferred form, includes an optical wavefront correction system for correcting for wavefront distortion in a received optical signal that is caused by small static anomalies in the surface geometry of the antenna aperture itself. In another preferred form the wavefront correction system includes, for example, a Shack-Hartmann wavefront sensor to detect dynamic antenna surface shape errors and atmospheric distortion. The wavefront sensor monitors the performance of the wavefront correction system and provides feedback control signals so that the wavefront correction system can achieve near diffraction limited performance under closed loop control.

In the various preferred embodiments, a narrow band optical filter is used to receive an output from the wavefront correction system and to pass only a desired bandwidth of the optical signal. In still another alternative preferred form, a wavefront division mutliplexing subsystem may be incorporated to provide a plurality of demultiplexed optical outputs from the output of the wavefront correction system.

In one preferred form the wavefront correction system comprises a static wavefront corrector formed by a computer-generated holographic optical element (CGHOE). In another preferred form the wavefront correction system includes a programmable, spatial light modulator that functions as a dynamic wavefront corrector to compensate for wavefront distortion caused by dynamic changes in the shape of the antenna and/or rapidly changing atmospheric abnormalities affecting the received optical signal.

In the preferred embodiments the wavefront correction system is supported closely adjacent to the antenna aperture of the antenna system. The overall antenna system forms a compact structure which can easily be carried by an individual and quickly and easily deployed for use when needed.

BRIEF DESCRIPTION OF THE DRAWINGS

The present invention will become more fully understood from the detailed description and the accompanying drawings, wherein:

FIG. 1 is a diagramatic view of an antenna system in accordance with a preferred embodiment of the present invention, with an antenna aperture of the system in a deployed, ready-for-use, configuration;

FIG. 2 is a view of the antenna system of FIG. 1 but with the antenna aperture illustrated in a stowed, non-usable configuration;

DETAILED DESCRIPTION OF THE PREFERRED EMBODIMENTS

Figure 3:
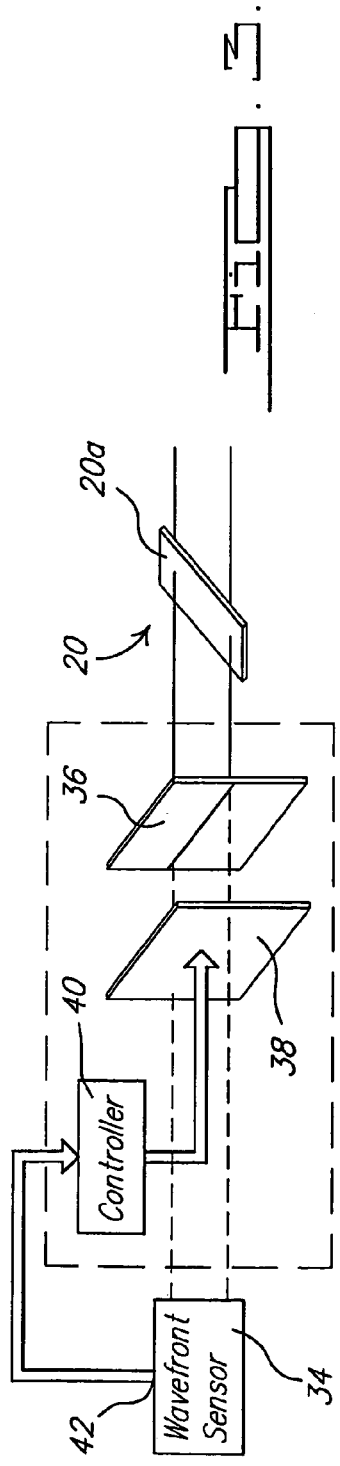
FIG. 3 is a block diagram of the components of the wavefront correction system.

The following description of the preferred embodiment(s) is merely exemplary in nature and is in no way intended to limit the invention, its application, or uses.

Referring to FIG. 1, there is shown an antenna system 10 in accordance with a preferred embodiment of the present invention. The antenna system 10 operates to receive both RF and optical radiation via a single antenna aperture 12. In referring to "RF" radiation it is meant electromagnetic wave radiation having a frequency of typically between about 1 GHz and 50 GHz or lower. The antenna aperture 12 is shown in FIG. 1 in its operative position ready for use. FIG. 2 illustrates the system 10 with the antenna aperture 12 in a stowed configuration for transport, making the system 10 much more easy and convenient to carry.

The antenna aperture 12 includes a reflector 13 made from suitable materials such as metalized mylar or stiff metalized molded plastic. The reflector 13 includes an axial center 14 at which is disposed a tubular light baffle/waveguide 16 extending perpendicularly therefrom and securely coupled to the area of the reflector 13 at the axial center 14. A frame structure 12a having a plurality of spokes extending radially from the tubular light baffle/wave guide 16, similar to that used on a conventional umbrella, supports the metalized mylar or other reflector material used to form reflector 13. A collimator 18 is disposed at one end of the light baffle 16 and receives reflected RF and optical radiation from the aperture 12 when the antenna system 10 is receiving RF and optical signals. The collimator 18 directs received RF and optical radiation through the tubular light baffle/waveguide 16 to a signal splitter 20. The signal splitter 20 is disposed closely adjacent to a rear surface 22 of the antenna aperture 12 and splits the RF component of the received signal from the optical component. An RF detector 24 detects the RF radiation component of the incoming signal and transmits same to appropriate RF signal processing electronics 26 for processing. An RF transmitter 24a generates RF energy that is applied to the aperture 12 when the aperture is used as an RF energy transmitter.

The signal splitter 20 incorporates a beamsplitting mirror 20a for transmitting the optical radiation into a wavefront correction system 28. The signal splitter 20 also incorporates an optically transparent conducting material. Such materials are routinely used in photonics devices. A thin film of indium-tin oxide deposited on a fused silica substrate is representative of such a material. The precise material is preferably chosen for highest RF reflectivity and highest optical transparency at the desired frequency of the antenna, which in this example is preferably at least about 1 GHz.

The wavefront correction system 28 compensates for both wavefront distortion errors caused by geometric surface anomalies in the antenna aperture 12, as well as wavefront distortion caused by changing atmospheric conditions to enable the antenna system to provide near diffraction limited performance. An output 30 of the wavefront correction system 28 is a near diffraction limited beam capable of being focused to a "spot" having a diameter of preferably less than 50 micrometers (microns), commensurate with the size of the active region of a high-speed optical detector. "Near diffraction limited" means that the size of the focused spot formed by the optical output signal is near the theoretical limit that can be produced. Optical output signal 30 may then be transmitted to a suitable optical detector 32 for further signal processing. Also, an optical emitter 32a could be incorporated if the antenna system 10 is to be bi-directional.

In a preferred embodiment, the antenna system 10 further comprises a wavefront sensor 34 that monitors the output 30 of the wavefront correction system 28, in real time, and which provides a feed back signal to the wavefront correction system 28 indicative of corrections needed to maintain the optical signal being output from the system 28 at the desired 50 micrometer spot size. One preferred wavefront sensor 34 is a Shack-Hartmann wavefront sensor that provides real-time monitoring of the optical output signal being generated by the wavefront correction system 28. Such a sensor is available from Spot-Optics, inc. of Padova, Italy. In operation, a portion of the collimated beam is directed by a beamsplitter into the Shack Hartmann sensor. In a typical Shack Hartmann sensor, a two-dimensional array of micro lenses focuses the collimated beam onto a two-dimensional sensor array (typically a CCD array) located at the focal position of the microlens array. The position of each microlens within the collimated beam is representative of a similar position across antenna aperture 22. The position of each focal spot on the detector array will vary in accordance with angular distortions within representative positions of the collimated beam due to atmospheric turbulence and/or dynamic variations of antenna aperture 22. The deviations of the focal spots from their nominal positions can be typically measured to $1/20^{th}$ of a pixel. This information is processed and used as the feedback signal for exercising the wavefront correcting capability of the SLM, with the goal of driving the positions of the focal spots back to their nominal locations on the sensor array.

The wavefront sensor 34 helps to form a closed-loop system that enables the wavefront correction system 28 to be periodically apprised of the overall quality of the optical signal which it is outputting, and to apply updated, periodic corrections as needed to ensure that the spot size of the output signal remains at the desired 50 μm spot size.

Referring briefly to FIG. 3, the wavefront correction system 28 is shown in greater detail. The wavefront correction system 28 includes a static wavefront corrector 36 and a dynamic wavefront corrector 38 in communication with a controller 40. The controller 40 is also in communication with an output 42 of the wavefront sensor 34. The static wavefront corrector 36 may comprise either a computer-generated holographic optical element (CGHOE) or a film holographic optical element (HOE), both of which are lightweight and capable of correcting for many thousands of wavelengths of error. The static wavefront corrector 36 essentially removes the errors induced in the optical signal due to errors in the shape of the antenna aperture 12. The antenna aperture 12, being deployable from a stowed, non-operative configuration to an operative configuration, typically will have some small degree of variation in its overall shape from one deployment to the next. The static wavefront corrector 36 acts as a "coarse" wavefront distortion correction component to remove the optical distortion caused by surface contour variations from the nominal deployed shape of the antenna aperture. The remaining wavefront distortion will be that due to deployment-related variations in the overall shape of the antenna aperture 12 and/or its surface contour. After coarse correction, the remaining wavefront errors will be sufficiently small to be within the correction capability of the dynamic Wavefront corrector 38. As a result, mechanical considerations such as simplicity, structural performance, ease of deployment/stowage, compactness, wind drag, and damage tolerance, rather than the accuracy of the reflector itself, are the predominant design considerations for the system 10.

The dynamic wavefront corrector 38 includes a programmable spatial light modulator (SLM) having an X-Y array of liquid crystal pixels, with each pixel being capable of changing its optical depth. The controller 40 controls electrical signals supplied to the liquid crystal pixels to modify the optical signal passing through the programmable SLM 38 so that small degrees of wavefront distortion caused by atmospheric anomalies and residual uncorrected antenna shape errors are either removed or substantially corrected in the optical radiation passing through the wavefront correction system 28. The feedback signals provided by the wavefront sensor 34 enable the controller to make real time adjustments as needed to maintain the output 30 of the wavefront correction system at the desired 50 μm spot size. Alternatively, the dynamic wavefront corrector 38 could comprise a controllably deformable mirror or micro electromechanical (MEM) micromirror array device. Accordingly, the dynamic waverfront corrector 38, in connection with the controller 40 and the wavefront sensor 34, operates to perform a degree of "fine" wavefront distortion correction for attenuating small degrees of rapidly changing optical distortion affecting the incoming optical radiation being received by the antenna aperture 12. In practice, the dynamic waverfront corrector 38 enables several hundred wavelengths of wavefront control. The wavefront correction system 28 further enables the control of fine pointing of the optical channel of the system 10, as it allows a phase pattern to be imposed to correct pointing errors up to one degree in magnitude. It will also be appreciated that both MEM mirror devices and liquid crystal spatial light modulator devices are presently commercially available and capable of programmable phase modulation of an incoming optical wave signal at video frame rates.

In the event that the optical signal output from the wavefront correction system 28 still cannot be focused to a suitably small spot size to be read by a 50 μm optical detector 32, then it may become necessary to utilize an array of microlensed photo detectors, rather than a single optical detector. Such a component is available from Rockwell Scientific Company of Thousand Oaks, Calif.

Figure 4:
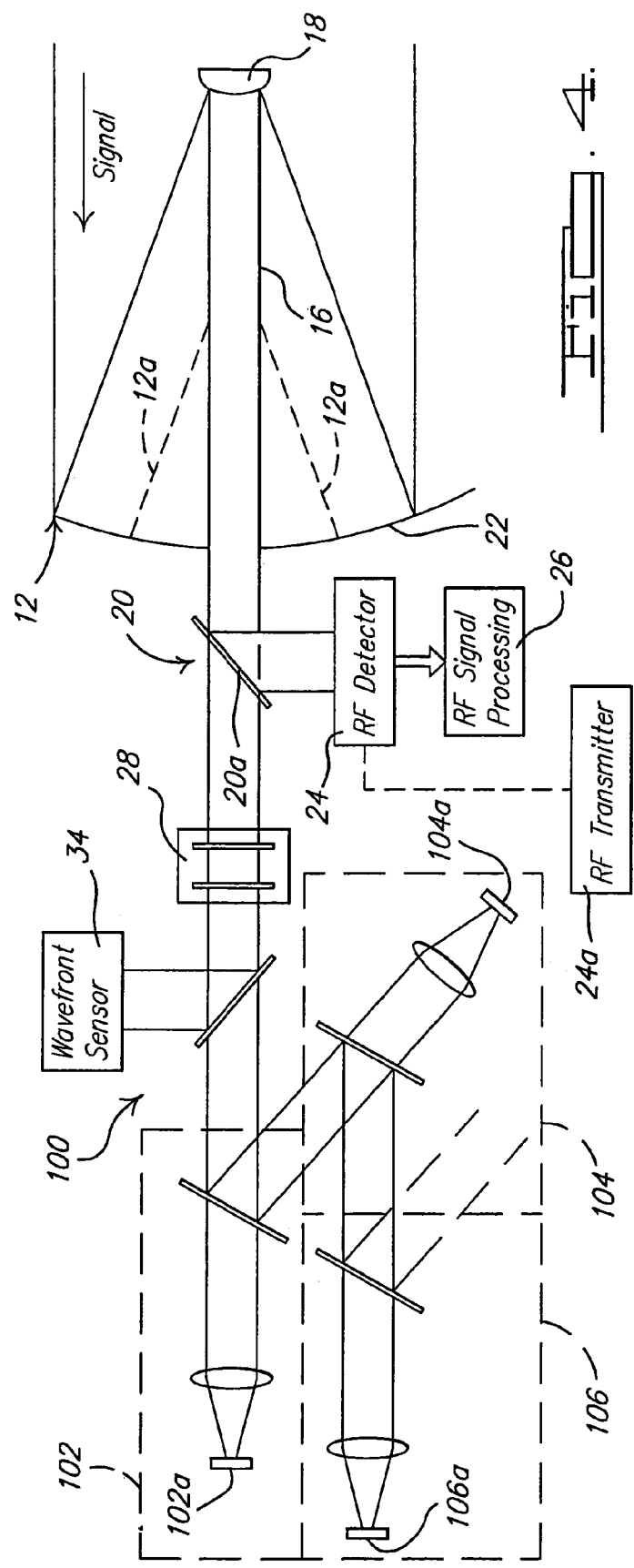
FIG. 4 is a view of an antenna system in accordance with an alternative preferred embodiment of the present invention incorporating a wavefront division multiplexing subsystem.

Referring now to FIG. 4, an antenna system 100 having a wavelength division multiplexing (WDM) system in accordance with an alternative preferred embodiment of the present invention is shown. The WDM system incorporates a plurality of bandpass filters 102, 104 and 106. Filters 102, 104 and 106 each provide optical outputs of predetermined optical bandwidths at detectors 102a, 104a and 106a. The number of bandpass filters can vary to generate any desired form and number of demultiplexed outputs.

The present invention thus provides an antenna system that integrates both RF and optical wave radiation receiving and transmitting capabilities. The wavefront correction system 28 of the present invention accommodates both coarse and fine wavefront distortion correction functions without adding significantly to the bulk of the overall antenna system, and without compromising its ability to be quickly and easily deployed or stowed. Most advantageously, the antenna system of the present invention can be used to simultaneously receive and transmit both RF and optical wave radiation, thus maximizing the utility of the system 10.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A combination radio frequency (RF) wave and optical wave reception system, comprising:
   a collapsible, field deployable antenna aperture deployable from a collapsed, compact, non-usable, stowed configuration to an expanded, deployed operative configuration for receiving both RF wave radiation and optical wave radiation;
   a waveguide extending from an axial center of the antenna aperture;
   a collimator in communication with the waveguide for collimating an optical signal portion received by said antenna and reflecting the optical signal portion through the waveguide, and reflecting an RF wave signal portion received by the antenna aperture through the waveguide;
   a signal splitter in communication with the waveguide for separating the RF wave and optical wave signal portions traveling through the waveguide; and
   an optical wavefront correction system in communication with the signal splitter for receiving said optical signal portion, the wavefront correction system structured to correct, in real-time, coarse and fine wavefront errors caused by at least one of atmospheric induced wavefront errors and surface geometry errors in said antenna aperture when deployed.

2. The system of claim 1, wherein the optical wavefront correction system comprises a static wavefront corrector for correcting coarse wavefront errors caused by imprecise surface geometry in said antenna aperture when trasitioned from the stowed configuration to the deployed configuration.

3. The system of claim 1, wherein the optical wavefront correction system comprises a dynamic wavefront corrector for correcting fine wavefront errors caused by atmospheric conditions and deployment related variations in the shape of said antenna aperture.

4. The system of claim 1, wherein the optical wavefront correction system includes a Shack-Hartmann wavefront sensor for monitoring and generating wavefront correction signals to maintain said optical output at a desired spot size.

5. The system of claim 1, further comprising a narrow band optical filter for receiving an output from the wavefront correction system and passing a predetermined bandwidth of said optical signal portion.

6. The system of claim 1, further comprising a wavelength division multiplexing system responsive to said output of said wavefront correction system for demultiplexing said optical signal portion.

7. An antenna system for receiving optical radiation, comprising:
   an antenna aperture deployable from a compact, non-usable configuration to an operative configuration for receiving optical wave radiation, the antenna aperture including:
      a plurality of spokes pivotally extending from a waveguide extending from an axial center of the antenna aperture;
      a collapsible reflector pivotally connected to the spokes such that the reflector is deployable from a first, collapsed inoperative configuration to a second, expanded and operative configuration;
      a collimator in communication with the waveguide for collimating the optical radiation received by said reflector and reflecting the optical radiation through the waveguide; and
   an optical wavefront correction system structured to correct, in real-time, coarse and fine wavefront distortion to said optical radiation.

8. The antenna system of claim 7, wherein said optical wavefront correction system comprises a static wavefront corrector that corrects for geometric anomalies in a shape of said reflector causing coarse wavefront distortion in said optical radiation.

9. The antenna system of claim 7, wherein said optical wavefront correction system further comprises:
   a dynamic wavefront corrector that corrects for dynamic changes in a wavefront of said optical radiation in real time.

10. The antenna system of claim 9, wherein said dynamic wavefront corrector comprises a programmable spatial light modulator.

11. The antenna system of claim 10, further comprising a wavefront sensor responsive to an output of said dynamic wavefront corrector for monitoring in real time said wavefront of said optical radiation and generating feedback signals to said dynamic wavefront corrector to assist in maintaining focusing of said output of said dynamic wavefront corrector.

12. The antenna system of claim 11, wherein said wavefront sensor comprises a Shack-Hartmann sensor.

13. The antenna system of claim 7, wherein said antenna aperture operates to receive electromagnetic wave radiation at frequencies in a gigahertz bandwidth and below.

14. An antenna system for receiving optical radiation, comprising:
   a collapsible, field deployable antenna aperture including a plurality of spokes pivotally extending from a waveguide extending from an axial center of the antenna aperture such that the aperture is deployable from a collapsed, compact, non-usable, stowable configuration to an expanded, deployed operative configuration for receiving optical wave radiation;
   a collimator in communication with the waveguide for collimating the optical radiation received by said antenna aperture and reflecting the optical radiation through the waveguide;

an optical wavefront correction system for providing, real-time, first and second degrees of wavefront distortion correction to said optical radiation, said wavefront correction system including:
- a static wavefront corrector that corrects for geometric anomalies in a shape of said antenna aperture causing wavefront distortion in said optical radiation; and
- a dynamic wavefront corrector that corrects for dynamic changes in a wavefront of said optical radiation;
- said optical wavefront correction system operating to focus said optical radiation into a desired spot size for subsequent optical detection.

15. The system of claim 14, wherein said antenna aperture and said collimator also receive radio frequency (RF) radiation; and
   wherein said system comprises a beam splitter for splitting said RF radiation and said optical radiation and transmitting said optical radiation to said wavefront correction system.

16. The system of claim 14, wherein said waveguide comprises a light baffle.

17. The system of claim 14, wherein said dynamic wavefront corrector comprises a programmable spatial light modulator.

18. The system of claim 14, wherein said static wavefront corrector comprises a computer generated holographic element (CGHOE).

19. The system of claim 14, further comprising a wavefront sensor responsive to an output of said dynamic wavefront corrector, for monitoring, in real time, said wavefront of said optical radiation and generating feedback signals to said dynamic wavefront corrector to assist in maintaining focusing of a desired spot size for said optical radiation.

20. The system of claim 19, wherein said dynamic wavefront corrector comprises a controller, said controller being responsive to an output from said wavefront sensor.

21. The system of claim 19, wherein said wavefront sensor comprises a Shack-Hartmann wavefront sensor.

22. The system of claim 14, further comprising an optical detector for receiving an output from said dynamic wavefront corrector.

23. The system of claim 14, further comprising a wavelength division multiplexing system for receiving an output from said dynamic wavefront corrector and demultiplexing said output to produce a plurality of independent optical output signals.

24. A combination radio frequency (RF) wave and optical wave antenna system, comprising:
- a collapsible, field deployable antenna aperture including a plurality of spokes pivotally extending from a waveguide extending from an axial center of the antenna aperture such that the aperture is deployable from a collapsed, non-usable, stowed configuration to an expanded, deployed operative configuration for receiving both RF wave radiation and optical wave radiation;
- a collimator in communication with the waveguide and supported from one end of the waveguide and the antenna aperture, for collimating an optical signal portion received by said antenna aperture and reflecting the optical signal portion through the waveguide, and for reflecting an RF wave signal portion received by the antenna aperture through the waveguide;
- a signal splitter supported from the antenna aperture and disposed adjacent a rear surface of the antenna aperture, and in communication with the waveguide for separating the RF wave and optical wave signal portions traveling through the waveguide;
- an optical wavefront correction system supported from the antenna aperture adjacent a rear surface of the antenna aperture, and in communication with the signal splitter for receiving said optical signal portion, the wavefront correction system structured to correct, in real-time, coarse and fine wavefront errors in said optical signal portion and focusing said optical signal portion into a desired spot size for subsequent detection.

25. The system of claim 24, wherein said optical wavefront correction system includes a static wavefront correction system for compensating for errors in a wavefront of said optical signal portion caused by surface geometry variations in said antenna aperture.

26. The system of claim 24, wherein said optical wavefront correction system includes a dynamic wavefront correction system for compensating for errors in a wavefront of said optical signal portion caused by dynamic atmospheric conditions and deployment related variations in the shape of said antenna aperture.

27. The system of claim 24, further comprising a Shack-Hartman sensor for monitoring performance of said wavefront correction system and generating control signals applied to said wavefront correction system to further enhance focusing of an optical signal generated by said wavefront correction system.

28. A method for receiving optical radiation and correcting for wavefront distortion in received optical radiation, comprising:
- transitioning a collapsible, field deployable antenna aperture, including a plurality of spokes pivotally extending from a waveguide of the antenna aperture, from a collapsed, compact, non-operative, stowed configuration to an expanded, deployed operative configuration to receiving optical radiation;
- using a collimator to receive said optical radiation from said antenna aperture;
- using a wavefront correction system disposed adjacent a rear surface of said antenna aperture to monitor and correct, in real-time, coarse and fine wavefront distortion affecting a wavefront of said optical radiation.

29. The method of claim 28, wherein using a wavefront correction system comprises:
- using a static wavefront correction system for removing wavefront distortion in said optical radiation caused by geometric anomalies in said antenna aperture.

30. The method of claim 28, wherein using a wavefront correction system comprises:
- using a dynamic wavefront correction system for removing wavefront distortion in said optical radiation caused by atmospheric conditions affecting said wavefront of said optical radiation and deployment related variations in the shape of said antenna aperture.

* * * * *